United States Patent
Versteyhe

(10) Patent No.: US 9,248,820 B2
(45) Date of Patent: Feb. 2, 2016

(54) SHIFTING PROCEDURE FOR POWERSPLIT SYSTEMS

(71) Applicant: Spicer Off-Highway Belgium, N.V., Bruges (BE)

(72) Inventor: Mark R. J. Versteyhe, Oostkamp (BE)

(73) Assignee: Dana Belgium N.V., Bruges (BE)

( * ) Notice: Subject to any disclaimer, the term of this patent is extended or adjusted under 35 U.S.C. 154(b) by 446 days.

(21) Appl. No.: 13/708,052

(22) Filed: Dec. 7, 2012

(65) Prior Publication Data

US 2013/0150210 A1 Jun. 13, 2013

Related U.S. Application Data

(60) Provisional application No. 61/568,687, filed on Dec. 9, 2011.

(51) Int. Cl.
| | | |
|---|---|---|
| B60W 10/02 | (2006.01) | |
| F16H 61/472 | (2010.01) | |
| F16H 47/04 | (2006.01) | |

(52) U.S. Cl.
CPC .............. *B60W 10/02* (2013.01); *F16H 47/04* (2013.01); *Y02T 10/76* (2013.01); *Y10T 477/6425* (2015.01)

(58) Field of Classification Search
CPC ................. B60W 20/40; F16H 61/472; F16H 2061/0407; Y10T 477/6414; Y10T 477/6425; Y10T 477/6203; Y10T 477/638
USPC ......................................... 475/72–82; 477/86
See application file for complete search history.

(56) References Cited

U.S. PATENT DOCUMENTS

| | | | |
|---|---|---|---|
| 3,427,899 A | 2/1969 | Gunderson | |
| 3,597,998 A | 8/1971 | Ebert | |
| 3,969,958 A * | 7/1976 | Miyao et al. | 475/82 |
| 4,286,477 A | 9/1981 | Meyerle | |
| 4,843,907 A | 7/1989 | Hagin | |
| 4,976,664 A | 12/1990 | Hagin | |
| 5,052,987 A | 10/1991 | Hagin | |
| 5,820,508 A | 10/1998 | Konig | |
| 6,871,129 B2 * | 3/2005 | Kitaori et al. | 701/51 |
| 2003/0054920 A1 * | 3/2003 | Berger et al. | 477/70 |
| 2004/0128048 A1 | 7/2004 | Iwatuki et al. | |
| 2004/0147355 A1 | 7/2004 | Grundl | |

(Continued)

FOREIGN PATENT DOCUMENTS

| | | |
|---|---|---|
| DE | 28 20 025 C3 | 3/1981 |
| DE | 42 06 023 C2 | 2/1994 |
| DE | 19625706 A1 | 2/1997 |
| DE | 19944792 A1 | 4/2000 |
| DE | 10124352 A1 | 11/2002 |

(Continued)

*Primary Examiner* — Justin Holmes
*Assistant Examiner* — Stacey Fluhart
(74) *Attorney, Agent, or Firm* — Marshall & Melhorn, LLC

(57) ABSTRACT

A method for shifting a transmission capable of operating in a hydrostatic power transmission mode or a blended hydrostatic and mechanical power transmission mode is provided. The transmission includes a mechanical portion and a hydraulic portion. The method comprises the steps of placing the transmission in the hydrostatic power transmission mode, reducing an amount of engagement of a primary clutch, adjusting a rotational speed of the hydraulic portion, increasing an amount of engagement of a secondary clutch, and engaging the secondary clutch and disengaging the primary clutch. The method for shifting the transmission minimizes torque interruption, increases a fuel efficiency of a vehicle, and increases a range of operating speeds of the vehicle the transmission is incorporated in.

17 Claims, 6 Drawing Sheets

(56) References Cited

U.S. PATENT DOCUMENTS

2006/0150767 A1 7/2006 Shah
2006/0155448 A1 7/2006 Shah
2011/0028269 A1* 2/2011 Park .................................. 477/5
2011/0030505 A1* 2/2011 Hoyle et al. ................ 74/665 A

FOREIGN PATENT DOCUMENTS

| DE | 10 12 9488 A1 | 1/2003 |
| FR | 2679975 A1 | 2/1993 |
| WO | WO 9415121 A1 | 7/1994 |
| WO | WO 0043695 A2 | 7/2000 |

* cited by examiner

| OPERATIONAL MODE | POWER SOURCE | VARIABLE DISPLACEMENT MOTOR | FORWARD CLUTCH | REVERSE CLUTCH | PRIMARY CLUTCH | SECONDARY CLUTCH |
|---|---|---|---|---|---|---|
| REVERSE POWERSPLIT | ROTATE POSITIVE DIRECTION | ROTATE FROM POSITIVE SPEED TO NEGATIVE SPEED WITH INCREASING VEHICLE NEGATIVE SPEED | OPEN | CLOSED | OPEN | CLOSED |
| REVERSE HYDROSTATIC | ROTATE POSITIVE DIRECTION | ROTATE FROM ZERO TO MAX POSITIVE SPEED WITH INCREASING NEGATIVE VEHICLE SPEED | OPEN | N/A | CLOSED | OPEN |
| NEUTRAL | ROTATE POSITIVE DIRECTION | ZERO SPEED | OPEN | OPEN | CLOSED | OPEN |
| FORWARD HYDROSTATIC | ROTATE POSITIVE DIRECTION | ROTATE FROM ZERO TO MAX NEGATIVE SPEED WITH INCREASING VEHICLE POSITIVE SPEED | N/A | OPEN | CLOSED | OPEN |
| FORWARD POWERSPLIT | ROTATE POSITIVE DIRECTION | ROTATE FROM NEGATIVE SPEED TO POSITIVE SPEED WITH INCREASING VEHICLE POSITIVE SPEED | CLOSED | OPEN | OPEN | CLOSED |

FIG. 2

SHIFTING PROCEDURE FOR POWERSPLIT SYSTEMS

CLAIM OF PRIORITY

The present application claims priority to and incorporates by reference U.S. Provisional Application No. 61/568,687 filed Dec. 9, 2011, entitled "Shifting Procedure for Powersplit Systems."

BACKGROUND OF THE INVENTION

The present invention generally relates to power transmission systems. More particularly, this invention relates to a powersplit transmission for a vehicle, in which the powersplit transmission may be operated in a hydrostatic power transmission mode or a blended hydrostatic and mechanical power transmission mode.

Vehicles that incorporate the powersplit transmission, such as earth moving machinery, industrial equipment, and others may be operated in the hydrostatic power transmission mode or the blended hydrostatic and mechanical power transmission mode. In the hydrostatic power transmission mode, a speed of the vehicle or a motion of a hydraulically operated attachment coupled to the vehicle may be precisely controlled. Such a mode of operation is particularly useful when loading and unloading the vehicle, performing work with the hydraulically operated attachment, or maneuvering the vehicle in constrained areas, for example. In the blended hydrostatic and mechanical power transmission mode, a portion of an output of a prime mover of the vehicle bypasses a hydrostatic portion of the powersplit transmission. Such a mode of operation is useful to increase an efficiency of the vehicle and increase a range of operating speeds of the vehicle, for example.

An operator of the vehicle typically desires to change from the hydrostatic power transmission mode to the blended hydrostatic and mechanical power transmission mode. Such a process is usually performed while the vehicle is performing work, such as accelerating the vehicle. When the powersplit transmission changes from the hydrostatic power transmission mode to the blended hydrostatic and mechanical power transmission mode, the vehicle typically experience a torque interruption.

It would be advantageous to develop a method for shifting a powersplit transmission between modes of operation that minimizes torque interruption, increases a fuel efficiency of a vehicle, and increases a range of operating speeds of the vehicle the powersplit transmission is incorporated in.

SUMMARY OF THE INVENTION

Presently provided by the invention, a method for shifting a powersplit transmission between modes of operation that minimizes torque interruption, increases a fuel efficiency of a vehicle, and increases a range of operating speeds of the vehicle the powersplit transmission is incorporated in, has surprisingly been discovered.

In one embodiment, the present invention is directed to a method for shifting a transmission. The transmission includes a mechanical portion drivingly engaged with an output of the transmission, a hydraulic portion, a primary clutch, and a secondary clutch. The primary clutch is disposed between the hydraulic portion and the output of the transmission and the secondary clutch is disposed between the hydraulic portion and the mechanical portion. The method comprises the steps of providing the transmission capable of operating in a hydrostatic power transmission mode or a blended hydrostatic and mechanical power transmission mode; placing the transmission in the hydrostatic power transmission mode; reducing an amount of engagement of the primary clutch, thereby adjusting a torque applied to the output; adjusting a rotational speed of the hydraulic portion to facilitate driving engagement between the hydraulic circuit and mechanical portion, thereby adjusting a torque applied to the output; increasing an amount of engagement of the secondary clutch, thereby adjusting a torque applied to the output of the transmission; and engaging the secondary clutch and disengaging the primary clutch.

In another embodiment, the present invention is directed to a method for shifting a transmission. The transmission includes a mechanical portion having an epicyclic gearset drivingly engaged with an output of the transmission, a hydraulic portion including a variable displacement pump and a variable displacement motor, a primary clutch, and a secondary clutch; the primary clutch disposed between the hydraulic portion and the output of the transmission and the secondary clutch disposed between the hydraulic portion and the epicyclic gearset. The method comprises the steps of providing the transmission capable of operating in a hydrostatic power transmission mode or a blended hydrostatic and mechanical power transmission mode; placing the transmission in the hydrostatic power transmission mode; reducing an amount of engagement of the primary clutch by placing the primary clutch in a slip condition, thereby adjusting a torque applied to the output; adjusting a rotational speed of the hydraulic portion by adjusting a displacement of at least one of the variable displacement pump and the variable displacement motor to facilitate driving engagement between the hydraulic circuit and mechanical portion, thereby adjusting a torque applied to the output; increasing an amount of engagement of the secondary clutch by placing the secondary clutch in a slip condition, thereby adjusting a torque applied to the output of the transmission; and engaging the secondary clutch and disengaging the primary clutch.

In a third embodiment, the present invention is directed to a method for shifting a transmission. The transmission includes a mechanical portion having an epicyclic gearset drivingly engaged with an output of the transmission, a hydraulic portion including a variable displacement pump and a variable displacement motor, a primary clutch, and a secondary clutch; the primary clutch disposed between the hydraulic portion and the output of the transmission and the secondary clutch disposed between the hydraulic portion and the epicyclic gearset. The method comprises the steps of providing the transmission capable of operating in a hydrostatic power transmission mode or a blended hydrostatic and mechanical power transmission mode; placing the transmission in the hydrostatic power transmission mode; reducing an amount of engagement of the primary clutch by placing the primary clutch in a slip condition, thereby adjusting a torque applied to the output; actively adjusting a rotational speed of the variable displacement motor to stay between a speed of a portion of the epicyclic gearset and a speed of the output to facilitate driving engagement between the hydraulic circuit and mechanical portion, thereby adjusting a torque applied to the output; increasing an amount of engagement of the secondary clutch by placing the secondary clutch in a slip condition, thereby adjusting a torque applied to the output of the transmission; monitoring a sum of torques applied to the output for an equilibrium condition; and engaging the secondary clutch and disengaging the primary clutch.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which:

FIG. 2 is a table showing a state of the components of the driveline illustrated in FIG. 1 in various operational modes of the driveline;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
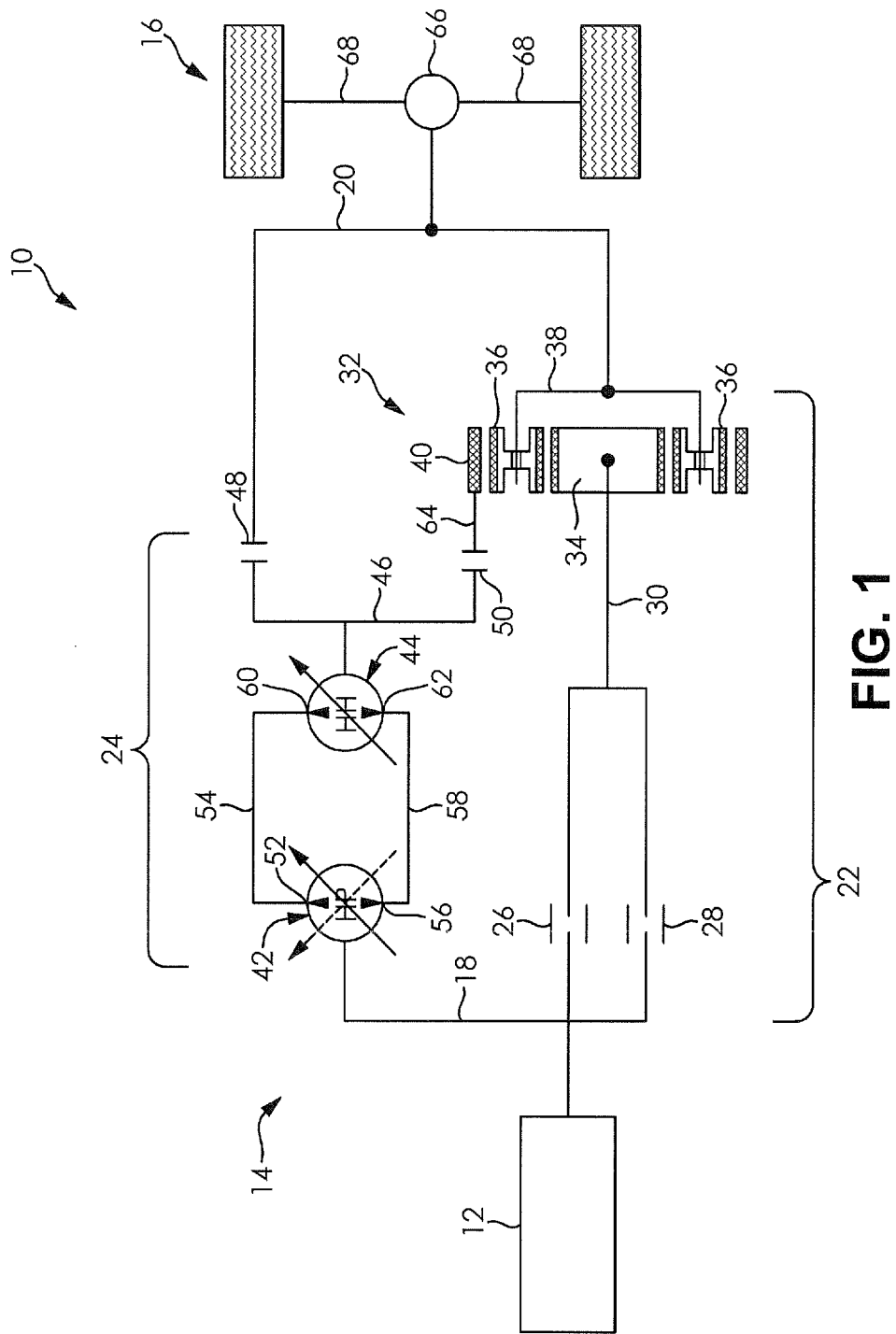
FIG. 1 is a schematic illustration of a driveline equipped with a powersplit transmission, which may be shifted according to an embodiment of the invention.

FIG. 1 schematically illustrates a driveline 10 for a vehicle. The driveline 10 comprises a power source 12, a powersplit transmission 14, and a vehicle output 16.

The power source 12 is drivingly engaged with an input 18 of the powersplit transmission 14. An output 20 of the powersplit transmission 14 is drivingly engaged with the vehicle output 16.

The power source 12 applies power to the input 18 of the powersplit transmission 14. The power source 12 is, for example, an internal combustion engine; however, it is understood that the power source 12 may include an electric motor or another source of rotational output. It is understood that the power source 12 may be a hybrid power source including both an internal combustion engine and an electric motor. Further, it is understood that the power source 12 may include an output ratio adjusting device as known in the art. Further, it is understood that the power source 12 may include a clutch (not shown) as known in the art, for one of reducing and interrupting a rotational force transferred to the powersplit transmission 14.

The powersplit transmission 14 is a power transmitting device comprising a mechanical portion 22 and a hydraulic portion 24. The input 18 of the powersplit transmission 14 is drivingly engaged with the mechanical portion 22 and the hydraulic portion 24. The input 18 may comprise a plurality of intermeshed gears; however, it is understood that the input 18 may comprise any device capable of splitting power between the mechanical portion 22 and the hydraulic portion 24. The mechanical portion 22 and the hydraulic portion 24 are drivingly engaged with the output 20 of the powersplit transmission 14. The mechanical portion 22 and the hydraulic portion 24 may share a housing (not shown) or the mechanical portion 22 and the hydraulic portion 24 may be respectively housed and disposed adjacent one another. Further, it is understood that at least a portion of the hydraulic portion 24 may be disposed elsewhere on the vehicle.

The mechanical portion 22 comprises a forward clutch 26, a reverse clutch 28, an intermediate portion 30, and an epicyclic gearset 32. It is understood that the forward clutch 26 and the reverse clutch 28 may be combined in a single unit.

The forward clutch 26 is a shift collar concentrically disposed about a portion of the input 18 and a portion of the intermediate portion 30. The forward clutch 26 includes a set of teeth which may be engaged with corresponding teeth formed on a portion of the input 18 and a portion of the intermediate portion 30; however, it is understood the forward clutch 26 may be substituted with any clutching device that permits selective engagement between the input 18 and the intermediate portion 30.

The forward clutch 26 may be positioned in an engaged position or a disengaged position by an actuator (not shown) as directed by a controller (not shown). In the engaged position, the forward clutch 26 facilitates driving engagement between a portion of the input 18 and a portion of the intermediate portion 30, allowing power to be applied to the intermediate portion 30. In the disengaged position, the forward clutch 26 is not drivingly engaged with one of the input 18 and the intermediate portion 30. The forward clutch 26 may also include a synchronizer which facilitates meshing engagement between the forward clutch 26 and one of the input 18 and the intermediate portion 30. The synchronizer is common and well known in the art.

The reverse clutch 28 comprises at least a shift collar concentrically disposed about a portion of the input 18 and a reverse gear assembly (not shown). The reverse gear assembly is drivingly engaged with a portion of the intermediate portion 30. The reverse clutch 28 includes a set of teeth which may be engaged with corresponding teeth formed on a portion of the input 18 and a portion of the reverse gear; however, it is understood the reverse clutch 28 may be substituted with any clutching device that permits selective engagement between the input 18 and the intermediate portion 30 while reversing a rotation therebetween.

The reverse clutch 28 may be positioned in an engaged position or a disengaged position by an actuator (not shown) as directed by the controller. In the engaged position, the reverse clutch 28 facilitates driving engagement between a portion of the input 18 and a portion of the intermediate portion 30 while reversing a rotation therebetween, allowing power to be applied to the intermediate portion 30. In the disengaged position, the reverse clutch 28 is not drivingly engaged with one of the input 18 and the intermediate portion 30. The reverse clutch 28 may also include a synchronizer which facilitates meshing engagement between the reverse clutch 28 and one of the input 18 and the intermediate portion 30. The synchronizer is common and well known in the art.

The intermediate portion 30 may comprise a plurality of intermeshed gears; however, it is understood that the intermediate portion 30 may comprise any device capable of facilitating driving engagement between the forward clutch 26 and the epicyclic gearset 32 and the reverse clutch 28 and the epicyclic gearset 32.

The epicyclic gearset 32 includes an sun gear 34 which is drivingly engaged with the intermediate portion 30. The sun gear 34 forms a portion of the epicyclic gearset 32. As shown in FIG. 1, the sun gear 34 is a sun gear; however, it is understood that the sun gear 34 may form other portions of the epicyclic gearset 32. The epicyclic gearset 32 also comprises the plurality of planet gears 36, a carrier 38, and a ring gear 40. The sun gear 34 includes a plurality of teeth formed about an outer surface thereof which is drivingly engaged with a plurality of planet gears 36.

The hydraulic portion 24 comprises a variable displacement pump 42, a variable displacement motor 44, a hydraulic output member 46, a primary clutch 48, and a secondary clutch 50. It is understood that the primary clutch 48 and the secondary clutch 50 may be combined in a single unit.

The variable displacement pump 42 is a hydraulic axial piston pump having a movable swashplate (not shown). However, it is understood the variable displacement pump 42 may be any other type of variable displacement pump. The variable displacement pump 42 is drivingly engaged with the power source 12 through the input 18. A first fluid port 52 of the variable displacement pump 42 is in fluid communication with a first fluid conduit 54. A second fluid port 56 of the variable displacement pump 42 is in fluid communication with a second fluid conduit 58.

The variable displacement motor 44 is a hydraulic axial piston motor having a movable swashplate (not shown). However, it is understood the variable displacement motor 44 may be any other type of variable displacement motor. The variable displacement motor 44 is drivingly engaged with the output 20 through the hydraulic output member 46 and the primary clutch 48 or the ring gear 40 of the epicyclic gearset 32 through the hydraulic output member 46 and the secondary clutch 50. A first fluid port 60 of the variable displacement motor 44 is in fluid communication with the first fluid conduit 54, facilitating fluid communication between the variable displacement pump 42 and the variable displacement motor 44. A second fluid port 62 of the variable displacement motor 44 is in fluid communication with the second fluid conduit 58, facilitating fluid communication between the variable displacement pump 42 and the variable displacement motor 44.

The variable displacement pump 42, the variable displacement motor 44, the first fluid conduit 54, and the second fluid conduit 58 form a fluid circuit as is known in the art. Further, it is understood that such a fluid circuit may include additional components such as a hydraulic cylinder, a directional valve, an accumulator, or a secondary motor.

The hydraulic output member 46 is drivingly engaged with the variable displacement motor 44 and a portion of the primary clutch 48 and the secondary clutch 50. The hydraulic output member 46 may comprise a plurality of intermeshed gears; however, it is understood that the hydraulic output member 46 may comprise any device capable of splitting power between the variable displacement motor 44 and the primary clutch 48 and the secondary clutch 50.

The primary clutch 48 is disposed about a portion of the hydraulic output member 46 and a portion of the output 20. The primary clutch 48 facilitates variable engagement between a portion of the hydraulic output member 46 and a portion of the output 20; however, it is understood the primary clutch 48 may be substituted with any clutching device that permits selective engagement between the hydraulic output member 46 and the output 20. As non-limiting examples, the primary clutch 48 may comprise a plurality of intermeshed plates, a cone clutch, or another style of clutch that may be variably engaged.

The primary clutch 48 may be positioned in an engaged position or a disengaged position by an actuator (not shown) as directed by the controller. In the engaged position, the primary clutch 48 facilitates driving engagement between a portion of the hydraulic output member 46 and a portion of the output 20, allowing power to be applied to the output 20. In the disengaged position, the primary clutch 48 is not drivingly engaged with one of the hydraulic output member 46 and the output 20.

The secondary clutch 50 is disposed about a portion of the hydraulic output member 46 and a portion of a ring gear member 64, the ring gear member drivingly engaged with the ring gear 40. The secondary clutch 50 facilitates variable engagement between a portion of the hydraulic output member 46 and a portion of the ring gear member 64; however, it is understood the secondary clutch 50 may be substituted with any clutching device that permits selective engagement between the hydraulic output member 46 and the ring gear member 64. As non-limiting examples, the secondary clutch 50 may comprise a plurality of intermeshed plates, a cone clutch, or another style of clutch that may be variably engaged.

The secondary clutch 50 may be positioned in an engaged position or a disengaged position by an actuator (not shown) as directed by the controller. In the engaged position, the secondary clutch 50 facilitates driving engagement between a portion of the hydraulic output member 46 and a portion of the ring gear member 64, allowing power to be applied to the ring gear 40 through the ring gear member 64. In the disengaged position, the secondary clutch 50 is not drivingly engaged with one of the hydraulic output member 46 and the ring gear member 64.

The output 20 is drivingly engaged with the primary clutch 48 and the carrier 38 of the epicyclic gearset 32; however, it is understood that the output 20 may be drivingly engaged with other portions of the epicyclic gearset 32. The output 20 may comprise a plurality of intermeshed gears; however, it is understood that the output 20 may comprise any device capable of facilitating driving engagement between the primary clutch 48 and the vehicle output 16 and the carrier 38 and the vehicle output 16.

As shown in FIG. 1, the vehicle output 16 includes an axle differential 66, which is drivingly engaged with a pair of axle half shafts 68. The axle differential 66 and the pair of axle half shafts 68 are conventional and well known in the art. Alternately, the vehicle output 16 may be any other type of power transmission device. As non-limiting examples, the power transmission device may be a transmission, a drive shaft, or a transaxle.

In use, the powersplit transmission 14 may be operated in a hydrostatic power transmission mode or a blended hydrostatic and mechanical power transmission mode.

When the powersplit transmission 14 is operated in the hydrostatic power transmission mode, variable displacement motor 44 is drivingly engaged with the output 20 through the hydraulic output member 46 and the primary clutch 48. The variable displacement motor 44 is fluidly driven by a variable displacement pump 42 through the first fluid conduit 54 and the second fluid conduit 58. The variable displacement pump 42 is drivingly engaged with the power source 12 through the input 18.

When the powersplit transmission 14 is operated in the blended hydrostatic and mechanical power transmission mode, the output 20 is driven by the variable displacement motor 44 through the hydraulic output member 46 and the primary clutch 48 and directly by the powers source 12 through one of the forward clutch 26 and the reverse clutch 28 and the epicyclic gearset 32. As shown in FIG. 1, the forward clutch 26 or the reverse clutch 28 drives the sun gear 34 of the epicyclic gearset 32 through a respectively positive ratio and a negative ratio, which may be configured accordingly based on a vehicle type and intended use of the driveline 10.

The variable displacement motor 44 may be engaged with one of the primary clutch 48 and the secondary clutch 50 through the hydraulic output member 46. The primary clutch 48 may be drivingly engaged with the output 20. The secondary clutch 50 may be drivingly engaged with the ring gear 40 of the epicyclic gearset 32 through the ring gear member 64. When the primary clutch 48 is placed in the engaged position and the secondary clutch 50 is placed in the disengaged position, the variable displacement motor 44 is drivingly engaged with the output 20 with a negative ratio. When the primary clutch 48 is placed in the disengaged position and the secondary clutch 50 is placed in the engaged position, the variable displacement motor is drivingly engaged with the ring gear 40 of the epicyclic gearset 32 through the ring gear member 64.

When the powersplit transmission 14 is operated in the blended hydrostatic and mechanical power transmission mode, the planet gears 36 are driven by both the ring gear 40 and the sun gear 34. The carrier 38, which is drivingly engaged with the output 20, is driven by the planet gears 36, which are rotatably disposed thereon.

FIG. 2 is a table showing a state of each of the power source 12, the variable displacement motor 44, the forward clutch 26, the reverse clutch 28, the primary clutch 48, and the secondary clutch 50 when the driveline 10 is placed in one of five operational modes. The five operational modes are: a reverse powersplit mode, a reverse hydrostatic mode, a neutral mode, a forward hydrostatic mode, and a forward powersplit mode.

In the forward hydrostatic mode and the reverse hydrostatic mode, the variable displacement motor 44 drives the output 20 through the primary clutch 48. The output 20 backdrives the carrier 38 of the epicyclic gearset 32. To militate against a transfer of torque to the sun gear 34, the secondary clutch 50 is placed in the disengaged position.

In the forward powersplit and the reverse powersplit mode, power from the mechanical portion 22 and the hydraulic portion 24 is combined using the epicyclic gearset 32. Power from the power source 12 is applied to the forward clutch 26 or the reverse clutch 28 and from the variable displacement motor 44 though the secondary clutch 50. The primary clutch 48 is placed in the disengaged position.

It is understood that the driveline 10 as illustrated in FIG. 1 may be placed in other powersplit configurations not shown in FIG. 2 or described herein. The operational modes as described herein are merely exemplary of some of the powersplit configurations that the driveline 10 illustrated in FIG. 1 may be placed in.

Torque interruption may occur when shifting the powersplit transmission 14 from the forward hydrostatic mode to the forward powersplit mode. During the forward hydrostatic mode, the variable displacement motor 44 is providing power at a negative torque input. After the transition to the forward powersplit mode, the variable displacement motor 44 is absorbing power at positive torque. Because of this transition, during the shift, the torque changes from a negative to a positive value. When the torque change from a negative to a positive value, the torque applied to the variable displacement motor 44 is about equal zero.

In the forward hydrostatic mode and the forward powersplit mode, an output torque is related to the torque of the variable displacement motor 44. As a non-limiting example, when the torque applied to the variable displacement motor 44 is about equal to zero, the output torque is about equal to zero. As such, when shifting, the output torque drops to zero during the shift and torque applied resumes after the shift. In some applications, the torque interruption is unacceptable.

Figure 3A:
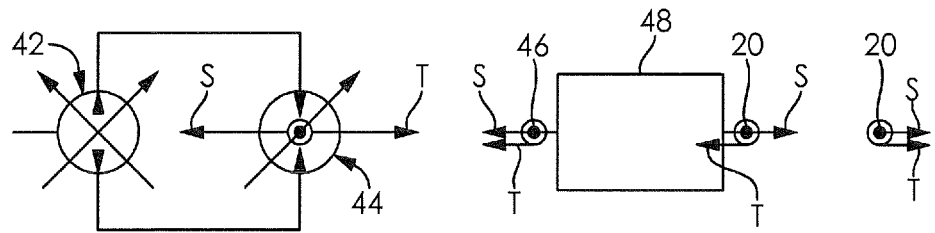
FIG. 3A graphically illustrates torque vectors associated with components of the driveline illustrated in FIG. 1 in a forward hydrostatic mode.

FIG. 3A graphically illustrates torque vectors of the variable displacement motor 44, the primary clutch 48, and the output 20 when the driveline 10 is placed in the forward hydrostatic mode. Reference letter "T" indicates a torque vector and reference letter "S" indicates a speed vector. An arrow pointed to the right indicates a positive vector, and an arrow pointed to the left indicates a negative vector. It should be noted that the torque vector applied to the variable displacement motor 44 is positive while the speed is negative, which may be interpreted as power being transferred from the variable displacement motor 44 to the output 20.

Figure 3B:
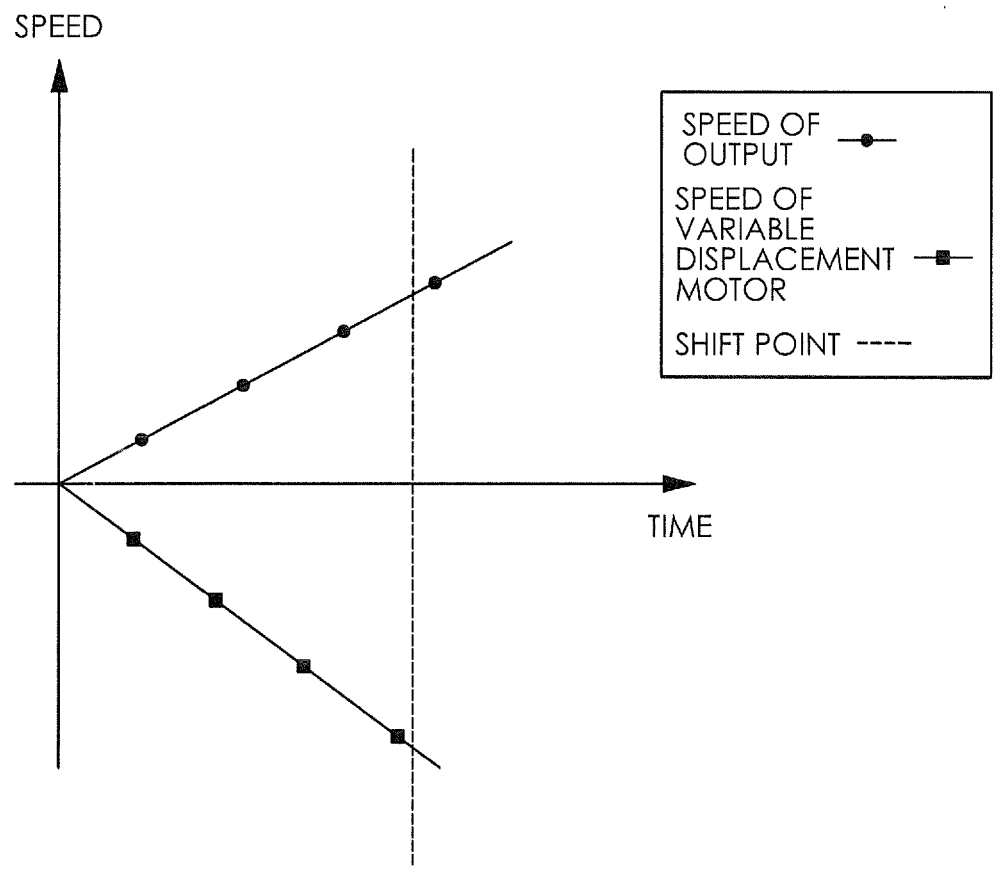
FIG. 3B graphically illustrates rotational speed associated with components of the driveline illustrated in FIG. 1 in a forward hydrostatic mode.

FIG. 3B graphically illustrates a speed of the output 20 and a speed of the variable displacement motor 44 with respect to time during a shift from the forward hydrostatic mode to the forward powersplit mode. It is understood that shifts from the forward powersplit mode to the forward hydrostatic mode, from the reverse hydrostatic mode to the reverse powersplit mode, and the reverse powersplit mode to the reverse hydrostatic mode may be adapted accordingly based on the known operative conditions.

In the forward hydrostatic mode, the variable displacement motor 44 is driving the output 20 with a negative ratio. When the speed of the variable displacement motor 44 is increased negatively by varying the displacement of the variable displacement pump 42 and/or the variable displacement motor 44, the output 22 is positively sped up.

Figure 4A:
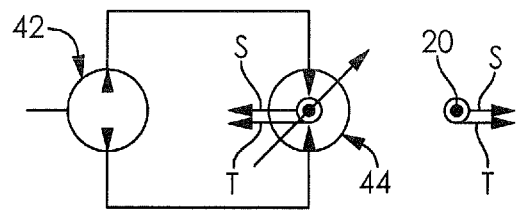
FIG. 4A graphically illustrates torque vectors associated with components of the driveline illustrated in FIG. 1 in a forward powersplit mode.

FIGS. 4A graphically illustrates torque vectors of the variable displacement motor 44 when the driveline 10 is placed in the forward powersplit mode, with similar references to FIG. 3A. In the forward powersplit mode, the variable displacement motor 44 is driving the ring gear 40 with a positive ratio through the secondary clutch 50 and the power source 12 is driving the sun gear 34 through the forward clutch 26 with a positive ratio. The carrier 38 is driven with a positive ratio to the output 20.

Figure 4B:
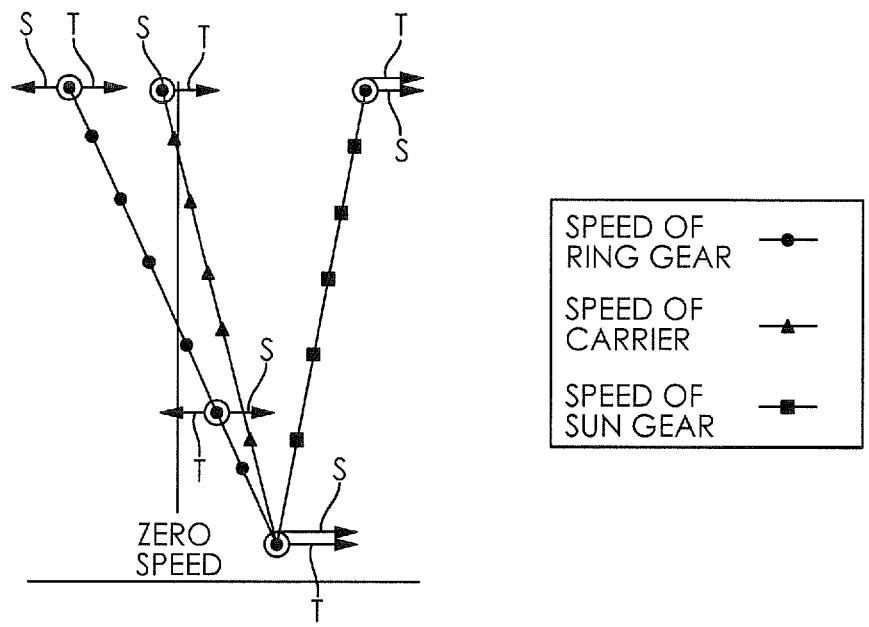
FIG. 4B is a speed diagram which graphically illustrates torque vectors associated with components of the driveline illustrated in FIG. 1 in a forward powersplit mode.
Figure 4C:
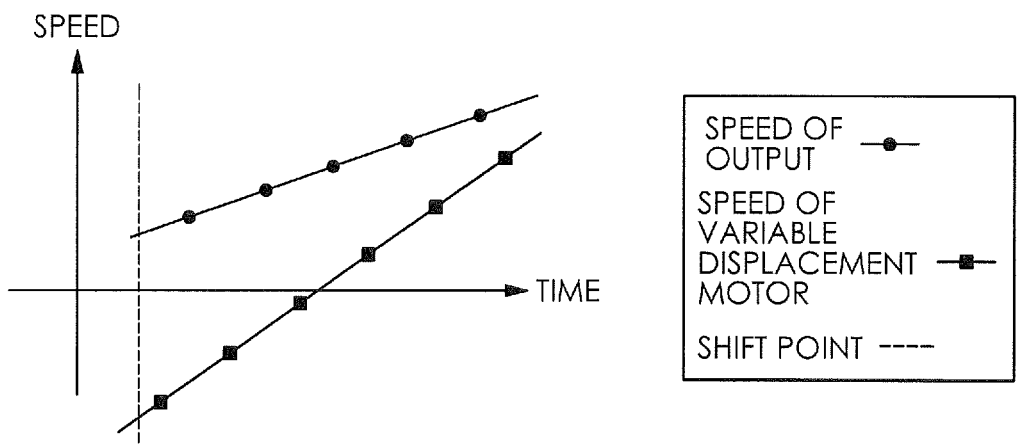
FIG. 4C graphically illustrates rotational speed associated with components of the driveline illustrated in FIG. 1 in a forward powersplit mode.

FIG. 4B illustrates a speed diagram of the epicyclic gearset 32 showing a speed of the ring gear 40 (which is directly related to the speed of the variable displacement motor 44) beginning at a negative speed and the speed of the sun gear 34 (which is directly related to the speed of the power source 12) being positive. As a result, a speed of the carrier 38 (which is directly related to a speed of the vehicle the driveline 10 is incorporated in) is positive.

FIG. 4B also illustrates that when the speed of the variable displacement motor 44 is changed from a negative speed to a positive speed, a speed of the output 20 is also increased.

It should be noted that the torque vector acting on the variable displacement motor 44 begins negatively so that initially the variable displacement motor 44 is absorbing power from the power source 12 through the epicyclic gearset 32. When a speed of the variable displacement motor 44 is about equal to zero, the variable displacement motor 44 is neither absorbing nor providing power so that all the power from the power source 12 is passed directly to the output 20 through the carrier 38. When a speed of the variable displacement motor 44 is positive, the variable displacement motor 44 supplements the power source 12 in providing power to the output 20.

When comparing FIGS. 3A, 4A, and 4B, it can be appreciate that a torque reversal of the variable displacement motor 44 from the forward hydrostatic mode to the forward power-split mode occurs. The advantage of the driveline 10 is that shifting between the forward hydrostatic mode and the forward powersplit mode can be done synchronously, meaning that the variable displacement motor 44 does not need to change speed shifting from the forward hydrostatic mode to the forward powersplit mode. Conversely, the torque does change from positive to negative.

Figure 5A:
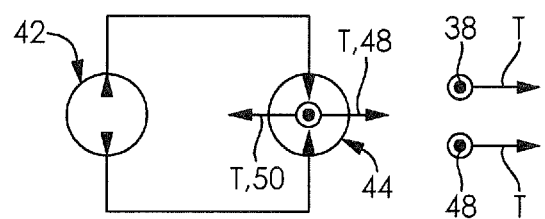
FIG. 5A graphically illustrates torque vectors associated with components of the driveline illustrated in FIG. 1 during a shift procedure from the forward hydrostatic mode to the forward powersplit mode.

FIGS. 5A graphically illustrates torque vectors applied to the variable displacement motor 44 by the primary clutch 48 and the secondary clutch 50 during a shift procedure from the forward hydrostatic mode to the forward powersplit mode, with similar references to FIG. 3A.

Figure 5B:
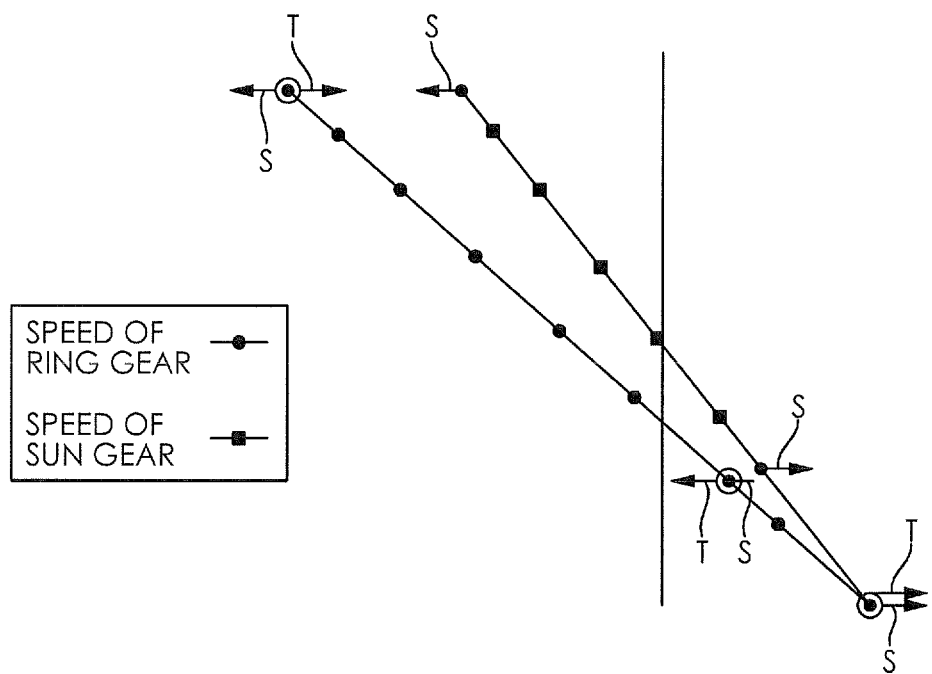
FIG. 5B is a speed diagram which graphically illustrates torque vectors associated with components of the driveline illustrated in FIG. 1 during a shift procedure from the forward hydrostatic mode to the forward powersplit mode.

FIG. 5B illustrates a speed diagram of the epicyclic gearset 32 showing a speed of the ring gear 40 (which is directly related to the speed of the variable displacement motor 44) beginning at a negative speed and the speed of the sun gear 34 (which is directly related to the speed of the power source 12) being positive. As a result, the speed of the carrier 38 (which is directly related to a speed of the vehicle the driveline 10 is incorporate in) is positive.

To prevent torque interruption, the application of torque to the output 20 should be continuous. To facilitate continuous torque application, the primary clutch 48 and the secondary clutch 50 may be partially opened or closed so that they are placed into a slip condition. When the primary clutch 48 and the secondary clutch 50 are placed into a slip condition, it is possible to control an amount of torque applied to the output 20 by adjusting a pressure applied to the primary clutch 48 and the secondary clutch 50. Further, it is possible to manipulate the speed of the variable displacement motor 44 (by adjusting the displacement of the variable displacement motor 44 or the variable displacement pump 42), instead of adjusting a pressure applied to the primary clutch 48 and the secondary clutch 50 to control whether the torque of the variable displacement motor 44 is positive or negative. Using the aforementioned techniques, the shift procedure can be developed that controls an amount of torque and whether the torque is positive or negative, and therefore it is possible to provide continuous torque to the output 22 despite the fact that the variable displacement motor 44 needs to provide zero torque at some point in time when shifting between the forward hydrostatic mode and the forward powersplit mode.

Figure 6:
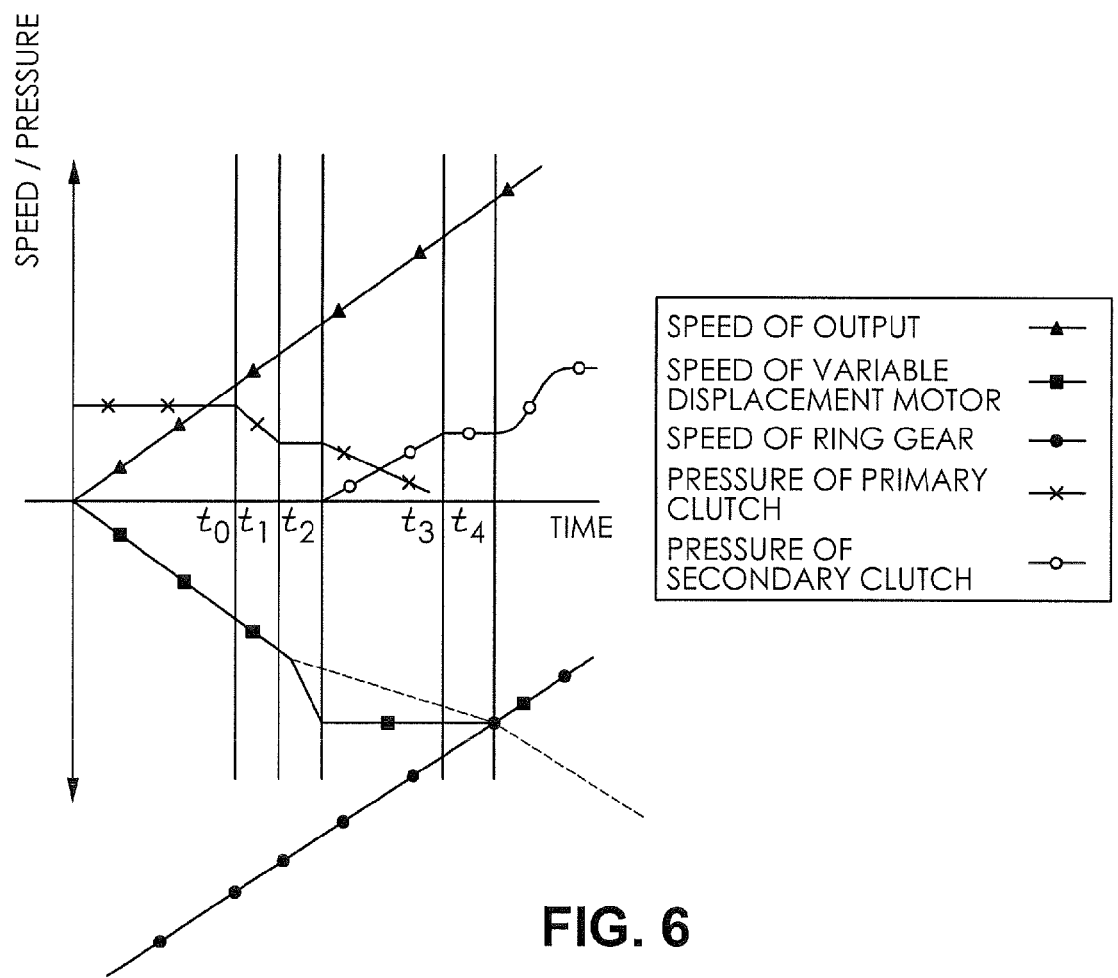
FIG. 6 graphically illustrates the shift procedure of the driveline illustrated in FIG. 1 according to an embodiment of the invention.

FIG. 6 graphically illustrates the shift procedure. A vertical positive axis displays the amount of pressure applied to the primary clutch 48 and the secondary clutch 50 versus time. The vertical positive axis also displays the speed of the output 20 versus time. A vertical negative axis displays the speed of the variable displacement motor 44 versus time. The vertical negative axis also displays the speed of the ring gear 40 versus time. The shift procedure is initiated prior to a synchronous shift point so that the torque vector of the variable displacement motor 44 may be adjusted accordingly using the following procedure. It is understood that the vertical values shown in FIG. 6 indicate a direction of rotation, and that a negative value indicates a direction of rotation opposite a positive value.

As seen in FIG. 6, between $t_0$ and $t_1$, the pressure applied to the primary clutch 48 is reduced to permit the primary clutch 48 to be placed in the slip condition. Consequently, the torque transferred through the primary clutch 48 is a function of the amount of pressure applied to the primary clutch 48. The pressure applied to the primary clutch 48 is reduced until the torque of the output 20, the torque transferred by the primary clutch 48, and the torque applied to the variable displacement motor 44 is about equal.

Next, between $t_1$ and $t_2$, the speed of the variable displacement motor 44 is controlled by adjusting the displacements of the variable displacement motor 44 and the variable displacement pump 42, so that the speed of the variable displacement motor 44 is between the speed of the ring gear 40 and the speed of the output 20.

Next, between $t_2$ and $t_3$, the speed of the variable displacement motor 44 is actively adjusted to stay between the speed of the ring gear 40 and the speed of the output 20. The pressure applied to the secondary clutch 50 is increased until torque is transferred from the variable displacement motor 44 to the ring gear 40. Simultaneously, the pressure applied to the primary clutch 48 is decreased. Accordingly, the torque applied to the output 20 is about equal to the sum of the torque transferred to the ring gear 40 (multiplied by a ratio of the ring gear 40 to the carrier 38) and the torque transferred through the primary clutch 48.

Further, the torque applied to the variable displacement motor 44 is about equal to the torque transferred through the primary clutch 48 minus the torque transferred through the secondary clutch 50.

As shown in FIG. 6, where the amount of torque transferred through the primary clutch 48 is decreased by about the same amount of torque transferred through the secondary clutch 50 is increased; the sum of the torques applied to the output 20 will remain about constant. When sum of the torques applied to the output 20 remains about constant, an equilibrium condition occurs and the torque applied to the variable displacement motor 44 can be shifted from a positive torque to a negative torque without changing the torque of the output 20 or causing torque interruption.

Next, at $t_3$, the primary clutch 48 is placed in the disengaged position, while the secondary clutch 50 is still in the slip condition.

Lastly, at $t_4$, the output 20 has increased in speed so that the ring gear 40 is completely synchronized with the variable displacement motor 44. Following the synchronization, the secondary clutch 50 can be placed in the engaged position, and the variable displacement motor 44 is now controlled to increase the speed of the vehicle the driveline 10 is incorporated in, as desired by an operator of the vehicle.

Further, in addition to the shift procedure as described above, it is understood that the shift procedure may be adapted to militate against a second torque interruption that may be caused by applying torque to the power source 12 through the sun gear 34 and one of the forward clutch 26 and the reverse clutch 28. To reduce the second torque interruption, a speed of the power source 12 may be increased and one of the forward clutch 26 and the reverse clutch 28 may be placed in a slip condition. The slip condition of one of the forward clutch 26 and the reverse clutch 28 is proportional to the amount of pressure that is applied to the secondary clutch 50.

The driveline 10 may also experience torque interruption when shifting from the blended hydrostatic and mechanical power transmission mode to a secondary blended hydrostatic and mechanical power transmission mode. It is understood that the method for shifting the powersplit transmission 14 as described hereinabove may be applied when shifting the powersplit transmission 14 from the blended hydrostatic and mechanical power transmission mode to a secondary blended hydrostatic and mechanical power transmission mode. The secondary blended hydrostatic and mechanical power transmission mode of operation may be useful to increase an efficiency of the vehicle and increase a range of operating speeds of the vehicle, for example.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method for shifting a transmission, comprising the steps of:
   providing the transmission capable of operating in a hydrostatic power transmission mode or a blended hydrostatic and mechanical power transmission mode; the transmission including a mechanical portion drivingly engaged with an output of the transmission, a hydraulic portion including a variable displacement pump and a variable displacement motor, a primary clutch, and a secondary clutch; the primary clutch disposed between the hydraulic portion and the output of the transmission and the secondary clutch disposed between the hydraulic portion and the mechanical portion;
   placing the transmission in the hydrostatic power transmission mode;
   reducing an amount of engagement of the primary clutch, thereby adjusting a torque applied to the output;
   adjusting a speed of an output of the variable displacement motor to stay between a speed of the mechanical portion and a speed of the output of the transmission, thereby adjusting a torque applied to the output of the transmission;
   increasing an amount of engagement of the secondary clutch, thereby adjusting a torque applied to the output of the transmission; and
   engaging the secondary clutch and disengaging the primary clutch.

2. The method for shifting a transmission according to claim 1, wherein the mechanical portion includes an epicyclic gearset.

3. The method for shifting a transmission according to claim 2, wherein a ring gear of the epicyclic gearset may be drivingly engaged with the hydraulic portion through the secondary clutch.

4. The method for shifting a transmission according to claim 2, wherein a carrier of the epicyclic gearset is drivingly engaged with the output of the transmission.

5. The method for shifting a transmission according to claim 1, wherein the mechanical portion includes a forward clutch and a reverse clutch.

6. The method for shifting a transmission according to claim 1, wherein the step of adjusting a speed of the output of the variable displacement motor is performed by adjusting a displacement of at least one of the variable displacement pump and the variable displacement motor.

7. The method for shifting a transmission according to claim 1, wherein the step of reducing an amount of engagement of the primary clutch includes placing the primary clutch in a slip condition.

8. The method for shifting a transmission according to claim 1, wherein the step of increasing an amount of engagement of the secondary clutch includes placing the secondary clutch in a slip condition.

9. The method for shifting a transmission according to claim 1, further comprising the step of monitoring a sum of torques applied to the output for an equilibrium condition after the step of increasing an amount of engagement of the secondary clutch.

10. The method for shifting a transmission according to claim 9, wherein the step of engaging the secondary clutch and disengaging the primary clutch is performed when the equilibrium condition is achieved.

11. A method for shifting a transmission, comprising the steps of:
    providing the transmission capable of operating in a hydrostatic power transmission mode or a blended hydrostatic and mechanical power transmission mode; the transmission including a mechanical portion having an epicyclic gearset drivingly engaged with an output of the transmission, a hydraulic portion including a variable displacement pump and a variable displacement motor, a primary clutch, and a secondary clutch; the primary clutch disposed between the hydraulic portion and the output of the transmission and the secondary clutch disposed between the hydraulic portion and the epicyclic gearset;
    placing the transmission in the hydrostatic power transmission mode;
    reducing an amount of engagement of the primary clutch by placing the primary clutch in a slip condition, thereby adjusting a torque applied to the output;
    adjusting a speed of an output of the variable displacement motor to stay between a speed of a portion of the epicyclic gearset and a speed of the output of the transmission, thereby adjusting a torque applied to the output of the transmission;
    increasing an amount of engagement of the secondary clutch by placing the secondary clutch in a slip condition, thereby adjusting a torque applied to the output of the transmission; and
    engaging the secondary clutch and disengaging the primary clutch.

12. The method for shifting a transmission according to claim 11, wherein a ring gear of the epicyclic gearset may be drivingly engaged with the variable displacement motor through the secondary clutch.

13. The method for shifting a transmission according to claim 11, wherein a carrier of the epicyclic gearset is drivingly engaged with the output of the transmission.

14. The method for shifting a transmission according to claim 11, further comprising the step of monitoring a sum of torques applied to the output for an equilibrium condition after the step of increasing an amount of engagement of the secondary clutch.

15. The method for shifting a transmission according to claim 14, wherein the step of engaging the secondary clutch and disengaging the primary clutch is performed when the equilibrium condition is achieved.

16. The method for shifting a transmission according to claim 11, wherein a ring gear of the epicyclic gearset may be drivingly engaged with the variable displacement motor through the secondary clutch and a carrier of the epicyclic gearset is drivingly engaged with the output of the transmission.

17. A method for shifting a transmission, comprising the steps of:
- providing the transmission capable of operating in a hydrostatic power transmission mode or a blended hydrostatic and mechanical power transmission mode; the transmission including a mechanical portion having an epicyclic gearset drivingly engaged with an output of the transmission, a hydraulic portion including a variable displacement pump and a variable displacement motor, a primary clutch, and a secondary clutch; the primary clutch disposed between the hydraulic portion and the output of the transmission and the secondary clutch disposed between the hydraulic portion and the epicyclic gearset;
- placing the transmission in the hydrostatic power transmission mode;
- reducing an amount of engagement of the primary clutch by placing the primary clutch in a slip condition, thereby adjusting a torque applied to the output;
- adjusting a rotational speed of an output of the variable displacement motor to stay between a speed of a portion of the epicyclic gearset and a speed of the output of the transmission, thereby adjusting a torque applied to the output of the transmission;
- increasing an amount of engagement of the secondary clutch by placing the secondary clutch in a slip condition, thereby adjusting a torque applied to the output of the transmission;
- monitoring a sum of torques applied to the output for an equilibrium condition; and
- engaging the secondary clutch and disengaging the primary clutch.

* * * * *